United States Patent [19]
Fleury, V

[11] Patent Number: 4,618,211
[45] Date of Patent: Oct. 21, 1986

[54] OPTICAL FIBER TAP WITH ACTIVATABLE CHEMICAL SPECIES

[75] Inventor: Paul A. Fleury, V, Basking Ridge, N.J.

[73] Assignee: AT&T Bell Laboratories, Murray Hill, N.J.

[21] Appl. No.: 588,223

[22] Filed: Mar. 12, 1984

[51] Int. Cl.$^4$ .............................................. G02B 6/24
[52] U.S. Cl. ............................. 350/96.15; 350/96.30; 350/96.34
[58] Field of Search ............... 350/96.15, 96.16, 96.29, 350/96.30, 96.34

[56] References Cited

U.S. PATENT DOCUMENTS

| | | | |
|---|---|---|---|
| 3,912,478 | 10/1975 | Presby | 65/2 |
| 3,931,518 | 1/1976 | Miller | 250/227 |
| 3,982,123 | 9/1976 | Goell et al. | 250/227 |
| 4,054,366 | 10/1977 | Barnoski et al. | 350/96.15 |
| 4,081,672 | 3/1978 | Caspers et al. | 350/96.15 X |
| 4,146,298 | 3/1979 | Szczepanek | 350/96.15 |
| 4,195,907 | 4/1980 | Zamja et al. | 350/96.15 X |
| 4,253,727 | 3/1981 | Jeunhomme et al. | 350/96.15 |
| 4,270,839 | 6/1981 | Cross | 350/96.15 |
| 4,307,932 | 12/1981 | Winzer | 350/96.15 |
| 4,315,666 | 2/1982 | Hicks, Jr. | 350/96.15 |
| 4,417,782 | 11/1983 | Clarke et al. | 350/96.29 |
| 4,422,714 | 12/1983 | Benoit et al. | 350/96.15 |

FOREIGN PATENT DOCUMENTS

2542590 4/1977 Fed. Rep. of Germany ... 350/96.15

OTHER PUBLICATIONS

S. E. Miller and A. G. Chynoweth, *Optical Fiber Telecommunications*, Academic Press, New York, (1979).
A. Bishay, "Radiation Induced Color Centers in Multicomponent Glasses", *Journal of Non-Crystalline Solids*, vol. 3, (1970), pp. 54-114.
K. O. Hill et al, "Photosensitivity in Optical Fiber Waveguides: Application to Reflection Filter Fabrication", *Applied Physics Letters*, vol. 32, No. 10, (May 15, 1978), pp. 647-649.
D. K. W. Lam et al, "Characterization of Single-Mode Optical Fiber Filters", *Applied Optics*, vol. 20, No. 3, (Feb. 1, 1981) pp. 440-445.
B. S. Kawasaki et al, "Narrow-Band Bragg Reflectors in Optical Fibers", *Optics Letters*, vol. 3, No. 2, (Aug. 1978), pp. 66-68.

*Primary Examiner*—William L. Sikes
*Assistant Examiner*—Frank González
*Attorney, Agent, or Firm*—Eugen E. Pacher

[57] ABSTRACT

An optical fiber communication system wherein predisposed emission means cause enhanced emission, at intermediate points along the fiber, of radiation propagating longitudinally through the fiber. Emission means according to this invention are incorporated into the fiber during fiber manufacture, and can be activatable or nonactivatable. Activatable means are preferred and comprise an effective concentration of an activatable chemical species, i.e., a species which can be activated by exposure to activating means, e.g., electromagnetic radiation, electrons, ions, or heat, activation typically resulting in a change of a fiber property, e.g, the refractive index, in a fiber region. Nonactivatable means comprise localized variations in one or more fiber parameters, spaced along the fiber. The enhanced emission can be detected and processed by conventional means.

13 Claims, 5 Drawing Figures

OPTICAL FIBER TAP WITH ACTIVATABLE CHEMICAL SPECIES

FIELD OF THE INVENTION

This invention pertains to the field of fiber optical communications systems, and optical fiber therefor.

BACKGROUND OF THE INVENTION

Rapid progress has been made in the development of fiber optical communication systems, and, as a result, such systems are now commercially available, both for short-haul as well as for long-haul applications.

A particular and promising application of optical fiber is in the role of high capacity data bus in multiple-access communications systems, for instance, in on-premises installations, also called local area networks, in which many computer terminals or other input/output devices are linked to a central processing unit or high capacity data link, and to each other. For this and other applications of optical fiber, it is often necessary to access the signal carried by a fiber at intermediate points along the fiber, and/or to inject signal radiation into the fiber at intermediate points. Substantial efforts have been expended in the past on developing means (to be referred to as "taps") for this purpose. Before discussing the results of these efforts, however, I will briefly review some relevant aspects of the transmission of electromagnetic radiation by optical fibers. A comprehensive review of the optical fiber communications field can, for instance, be found in *Optical Fiber Telecommunications*, edited by S. E. Miller and A. G. Chynoweth, Academic Press, 1979.

Optical fibers guide electromagnetic radiation, typically radiation in the visible or infrared part of the spectrum, by utilizing the phenomenon of total internal reflection. As is well known, electromagnetic radiation, traveling in a medium having an index of refraction $n_1$, is reflected totally at an interface with a medium having a refractive index $n_2$ if $n_1 > n_2$ and the angle of incidence at the interface is below a critical angle, the magnitude of which depends on $n_1$ and $n_2$.

Optical fiber typically is substantially longitudinally uniform, with a relatively high-index, central region, often referred to as the core, surrounded by a relatively low-index region, the cladding. The radial refractive index profile of optical fiber can show an abrupt change at the corecladding interface, or it can have more complicated shape. Appropriately designed fibers can guide one or more modes of radiation of the appropriate wavelength, yielding single mode or multimode fiberguides, respectively.

Although the greatest part of the electromagnetic radiation guided by an optical fiber is confined to the core, a small part of the total radiation field, the so-called evanescent wave, exists in the cladding region adjacent to the core. The signal being transmitted through the fiber in the form of modulated electromagnetic radiation (typically pulses) thus can, in principle, be accessed outside of the core region, and many prior art methods for tapping optical fiber make direct use of this fact. For instance, U.S. Pat. No. 4,054,366, issued Oct. 18, 1977, to M. K. Barnoski et al, discloses a fiber optic coupler in which a second fiber is fused longitudinally to a first fiber, thereby permitting coupling of evanescent waves from one fiber into the other. And U.S. Pat. No. 3,982,123, issued Sept. 21, 1976 to J. E. Goell et al, discloses an optical fiber tap comprising a dielectric body brought into contact with a section of the fiber from which all or most of the cladding material has been removed, thereby facilitating coupling of evanescent waves into the coupling body.

A somewhat different approach is taken by those prior art methods which locally alter the guiding properties of the optical fiber by external means, such that a part of the energy in the guided core modes is locally transferred into the cladding, and/or is radiated, or otherwise removed therefrom. For instance, U.S. Pat. No. 3,931,518, issued Jan. 6, 1976 to S. E. Miller, teaches a optical fiber tap comprising means for causing a transition of a portion of the signal power in the fiber from lower order core modes to higher order modes. The mode coupling means are exemplified by a pair of corrugated plates pressed against the fiber to periodically deform a region of the fiber just preceding the fiber tap. And U.S. Pat. No. 4,253,727, issued Mar. 3, 1981 to L. Jeunhomme et al, discloses a fiber tap comprising a grating to force the fiber into undulating shape, causing light to be radiated from the undulating portion of the fiber.

A related approach is disclosed in U.S. Pat. No. 4,270,839, issued June 2, 1981 to M. A. Cross, showing means for inducing bends in an optical fiber, resulting in radiation of optical signal power from the fiber. And U.S. Pat. No. 4,146,298, issued Mar. 27, 1979, to P. S. Szczepanek, discloses an optical fiber tap in which energy is caused to leak from the core into the cladding by raising the refractive index of the cladding in the tap region, such as by ion implantation, and detecting radiation from the fiber in the tap region.

U.S. Pat. No. 4,307,932, issued Dec. 29, 1981 to G. Winzer, discloses, inter alia, somewhat different means for extracting a signal from an optical fiber. In particular, FIG. 1B of that patent discloses a notch in the fiber cladding, intended to cause scattering of radiation from the guiding region of the fiber into the space surrounding the fiber, where the scattered radiation can be detected and transformed into an electrical signal in the usual way.

As can be seen from the above discussion, prior art optical fiber taps typically require physical, e.g., mechanical, modification of the fiberguide subsequent to fabrication of the fiber. This modification generally is carried out in situ, i.e., after installation of the fiberguide and determination of the tap site. Typically, this entails deforming the fiber, or otherwise modifying the fiber, e.g., by notching or ion implantation, or by fusing of another fiber thereto. The prior art approaches often result in weakening of the fiberguide, and, furthermore, may require some delicate and/or complex treatment or procedure (e.g., notching of the cladding with a laser) that may not easily be carried out in the field. Prior art approaches also typically do not lend themselves readily to post-installment change of tap location, and typically are not "reciprocal", i.e., do not permit injection as well as removal of radiation. A method not subject to these shortcomings, i.e., a method for tapping signal radiation from an optical fiberguide that does not require in situ mechanical modification of the fiber, with embodiments that allow substantially arbitrary placement of tap sites, that does not appreciably reduce the mechanical strength of the fiber, and that can, in appropriate embodiments, yield reciprocal taps, would, inter alia, greatly enhance the versatility and ease of installation of multiple-accessed optical fiber communications systems, and is, therefore, of considerable technological and commercial interest. Such a method is the subject of the instant invention.

DEFINITIONS

"Emission" herein is a process that results, due to interaction between the electromagnetic radiation of wavelength $\lambda_o$ propagating in a fiberguide and emission means in the emission region, in (enhanced) radiation of electromagnetic energy from the emission region of the fiberguide. The emitted radiation can be of wavelength $\lambda_o$ and/or of a wavelength different from $\lambda_o$. The interactions leading to emission are intended to include absorption, followed by emission, of radiation by a chemical species present in the fiberguide, as well as scattering processes not requiring absorption.

"Emission means" are means for causing emission of radiation from the fiber. The term is intended to refer both to fully formed means, (e.g., a localized variation in a fiberguide parameter such as core diameter), and to inchoate means (e.g., a longitudinally substantially uniform distribution of an activatable chemical species in the fiberguide), which require activation to yield a fully formed emission region.

"Predisposed" emission means are emission means that are incorporated into the fiberguide during fiberguide manufacture.

A "localized longitudinal variation" of a fiberguide parameter X exists if the derivative of X with respect to the longitudinal fiber coordinate is essentially zero for substantially all of the fiberguide, but has a value substantially different from zero in at least one section of fiberguide of limited longitudinal extent.

The "nominal" value of the fiberguide parameter X is the average value of X in those parts of the fiberguide that are free of localized longitudinal variations in X.

"Radiation of wavelength $\lambda_o$" implies a relatively narrow band of electromagnetic radiation, nominally centered on $\lambda_o$, typically in the visible or infrared part of the spectrum.

"Chemical species" includes both atomic and molecular species, neutral or ionized.

The "microstructure" of a region of fiberguide is determined by the spatial arrangement of the atoms in the region, e.g., by the degree of long range order in the region.

SUMMARY OF THE INVENTION

An object of the instant invention is to provide an optical communications system, and fiberguide therefor, which permits access (at intermediate points along the fiberguide) to signals transmitted through the fiber, without need for in situ mechanical modification of the fiber in the tap region. This object is realized in a communication system comprising optical fiber, means for producing signal radiation, for coupling the radiation into the fiber, and for detecting the transmitted signal, means for producing enhanced emission of radiation at an intermediate region of the fiber, and means for detecting the radiation emitted at the intermediate region. The emission means comprise predisposed emission means, namely, means incorporated into the fiber during fiber manufacture. These means are either activatable or nonactivatable. The former category comprises an effective concentration of an activatable chemical species in the fiber, activation being by exposure of a fiber region to activating means (electromagnetic radiation, electrons, ions, or heat), whereby a localized variation of one (or more) fiber parameters (e.g., core or clad refractive index) is produced. The latter category of emission means comprises localized variations in a fiber parameter, e.g., fiber diameter, core diameter, chemical composition of the core and/or the cladding, or refractive index of the core and/or the cladding, that are incorporated into the fiber during fiber manufacture.

As indicated above, two types of predisposed emission means are contemplated. The first and preferred type, the activatable type, requires exposure of a fiber region to appropriate activating means, such exposure resulting in formation of an emission region through activation of at least part of one (or more) activatable chemical species in the fiber. Activation can, for instance, produce a transition of activatable entities from a first to a second electronic or configurational state, e.g., formation of color centers by means of exposure to UV radiation, or it can produce a change of the microstructure in the region, e.g., formation of microcrystallites.

The second type of predisposed emission means comprises localized variations in a fiber parameter, the variations incorporated into the fiber during fiber manufacture. The variations are produced during any appropriate phase of fiber manufacture, for instance, during the pulling of the fiber from the preform, or incorporated into the preform during preform manufacture, and are spaced at appropriate intervals along the fiber, e.g., every few meters or so. Emission means of the second type thus do not permit complete freedom of tap placement.

BRIEF DESCRIPTION OF THE DRAWINGS

Identical or analogous features appearing in different figures are identified by the same reference numeral.

DETAILED DESCRIPTION

Figure 1:
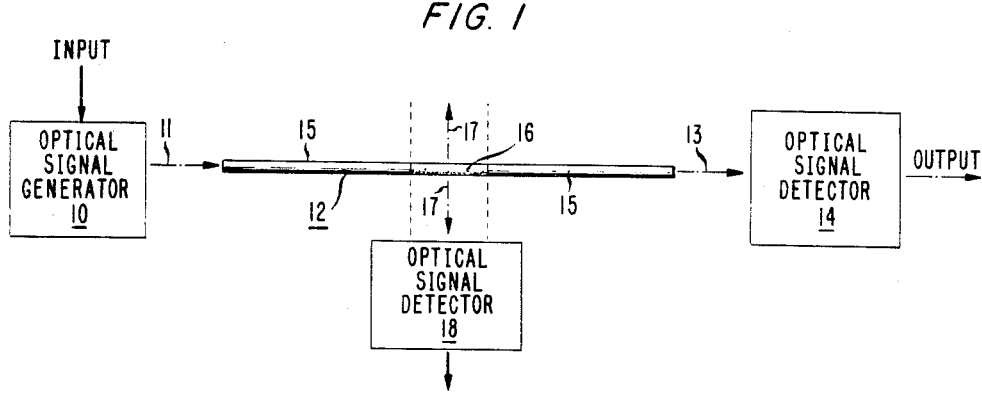
FIG. 1 schematically shows an optical communications system according to the invention.

A communication system according to the invention is schematically shown in FIG. 1. An appropriate input, typically an electrical signal, to optical signal generator 10 results in a modulated optical signal 11, for instance, a sequence of light pulses. The signal is coupled, by means not shown, into one end of optical fiberguide 12. The fiberguide can be any appropriate type of optical fiber, e.g., Si-based, multicomponent, or nonoxidic glass, graded index or step index multimode fiber, or single mode fiber, can be a single fiberguide or a member of a multi-fiberguide cable, and typically is coated with appropriate coating material, e.g., a curable polymer. After guided transmission through the length of the fiberguide, some fraction of the signal radiation coupled into the fiberguide at the first end arrives at the second fiberguide end and is emitted therefrom. Emitted signal radiation 13 is detected by optical signal detector 14, with the optical signal typically being transferred into an electrical output signal. Fiberguide 12 is shown in FIG. 1. to comprise regions 15 and 16, region 16 being a tap region comprising predisposed emission means, not shown here. The presence of the emission means results in enhanced removal of signal radiation from the propagating radiation in the guiding region of the fiber, and emission of radiation from the fiber in the tap region, as indicated schematically by arrows 17. At least some of radiation 17 is detected by optical signal detector 18, resulting typically in a tap output electrical signal. Optical signal generators, detectors, input optics, output optics, electronic amplifying and regenerating means and other means required for operation of such a communication system are conventional and need no elaboration. Although detection of the radiation emitted from the tap region, e.g., by means of a photodiode, is the preferred approach, it is in principle also possible to couple part of the emitted radiation into another optical waveguide, including another fiber, or utilize the emitted radiation in some other way.

I will now describe in some generality aspects of the invention pertaining to activatable predisposed emission means. Fiber containing activatable predisposed emission means typically comprises a substantially longitudinally uniform distribution of atoms of at least one activatable chemical species. The species is advantageously incorporated into the fiber material during preform fabrication. However, if, for instance, the concentration of the activatable species can be relatively low, other techniques for incorporating the species into the fiberguide can be used, e.g., in-diffusion or ion implantation during or following fiber drawing.

Figure 2:
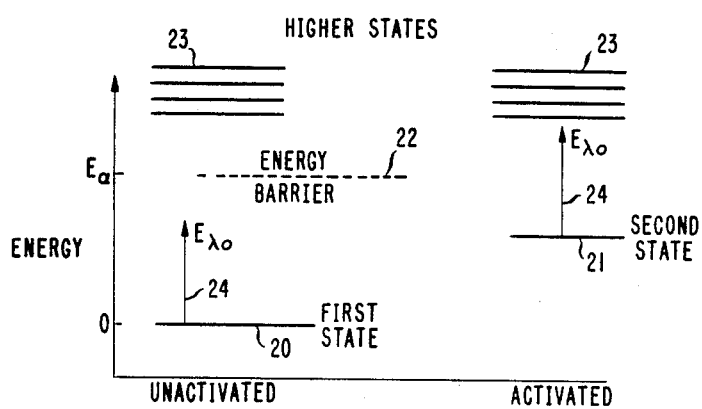
FIGS. 2 and 3 schematically show energy level diagrams for hypothetical activatable species useful in the practice of the invention.

An exemplary enery level diagram of a hypothetical activatable chemical species suitable for the practice of the invention is schematically shown in FIG. 2. In the unactivated state, the species is in the first state, typically the ground state of the chemical species in the fiber material, represented by energy level 20, with no higher energy levels 23 within $E_{\lambda_o}$ (the energy of a photon of signal radiation) of 20. (The energy E of a photon is related to the wavelength $\lambda$ of the photon by the well-known expression $E = hc/\lambda$.) After activation, the species is in the second state 21, also referred to as the "activated" state, again with no higher states 23 within $E_{80\ o}$ of 21. Activation requires that an energy barrier, indicated by 22, be surmounted by the system. This is achieved, for instance, by absorption of a photon of energy $E \geqq E_a$, the height of the energy barrier above the first state, by an unactivated atom. A chemical species that has an energy level diagram similar to the one shown in FIG. 2 does not have appreciable absorption probability for signal radiation in either state 20 or 21. However, there can exist some other difference in photon/atom interaction between the two states. For instance, the two states can differ in their respective positions with respect to higher states 23 and, consequently, activated atoms would differ from unactivated ones in their optical properties, typically resulting in a change of the refractive index of a fiber region upon activation of an effective number of such atoms therein.

Figure 3:
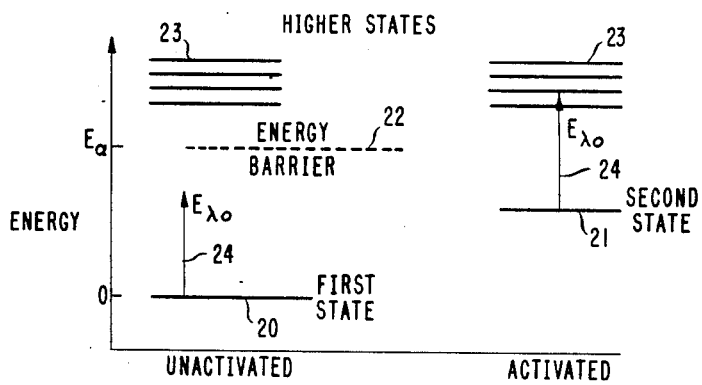

An exemplary energy level diagram of another hypothetical activatable species suitable for the practice of the invention is schematically shown in FIG. 3. It differs from the diagram of FIG. 2 in that at least some of higher states 23 are within $E_{\lambda_o}$ of the second state level 21, and activated atoms therefore can absorb signal radiation, followed by emission of radiation at $\lambda_o$ or at a different wavelength. Such "absorbing" activatable atoms advantageously have relatively short lifetimes in the relevant higher states, typically not exceeding the signal pulse length used in the communication system according to the invention, and preferably do not have dominant nonradiative de-excitation probability. The former requirement insures that emitted radiation is substantially in synchronism with the exciting radiation, and the latter that a sufficient flux of emitted radiation can be available for detection. From the above discussion, it is apparent that "absorbing" and "nonabsorbing" herein refers to radiation of wavelength $\lambda_o$.

FIGS. 2 and 3 schematically illustrate the energy level arrangements of, for instance, radiation inducible color center. For a review of color centers in multicomponent glasses, see A. Bishay, *Journal of Non-Crystalline Solids*, Vol. 3, pp. 54–114 (1970), incorporated herein by reference. In solids, the energy levels typically are broadened to form energy bands, and the depiction of sharp levels in FIGS. 2 and 3 is for ease of presentation only.

The presence of an appropriate activatable species in a fiber can also result, upon exposure of a fiber region to appropriate activating means, e.g., heat or thermal radiation, in a change of the microstructure of the exposed region. This typically results in a change of the propagation characteristics, e.g., the refractive index, of the region. For instance, the presence of $Al_2O_3$ in the core of $SiO_2$-based fiber (typically less than about 5 mole percent) lowers the devitrification temperature of the glass, permitting creation of a tap region in such fiber by local application of heat to the fiber.

An activatable species according to the invention can be incorporated into the fiber substantially for tapping purposes only, or its presence can serve, in addition to permitting tap formation, also other functions. For instance, the species in the first state can also serve to modify the refractive index of the material, e.g., by raising the refractive index in the core region of the fiber, or by depressing it in all or part of the deposited cladding region. An example of the former is Ge, which is a common index-raising dopant in silica fiber, but which can also be activated to result in a change in the refractive index in the activated fiber region. See, for instance, K. O. Hill et al, *Applied Physics Letters*, Vol. 32(10), pp. 647–649 (1978). Other index-modifying dopants that are possible activatable species are Al, P, F, and B. In fiber according to the invention, an activatable species that is also an index-modifying dopant is distributed in a manner not found in prior art fiber, namely, the species is distributed in a manner not efficiently suited for producing, by itself, a radiation-guiding structure. Such structures typically require that the normalized index difference $\Delta$ between core and clad be at least about 0.05%, preferably at least about 0.1%. Inventive fiber thus is distinguishable from prior art fiber. The difference in distribution is an expression of the multiple functions served by the species in the fiber. For instance, the activatable species can be distributed substantially uniformly throughout both core and clad of the fiber, be present in the core or the clad in a concentration not typically found in prior art fiber, or have a distribution profile typically not found in prior art fiber.

After the location of a tap site has been selected, typically after installation of the fiber, the tap in a fiber containing an activatable species is created by exposure of the selected region to the appropriate activating means, e.g., to $\gamma$, X, UV−, visible, or near IR radiation (i.e., electromagnetic radiation typically having wavelength less than about $\lambda_o$), thermal radiation, electron or ion radiation, or heat, such that a change in some fiber property (e.g., core refractive index, absorption, Rayleigh or Raman scattering efficiency), sufficient to produce an effective degree of emission, results.

Prior to the exposure to the activating means some preparatory steps typically have to be undertaken, e.g., removal of protective coatings from the fiber in the tap region. Procedures for carrying out such steps are familiar to those skilled in the art, as are fiberprotective measures that are advantageously taken after exposure of the tap region, and will therefore not be discussed here.

Figure 4:
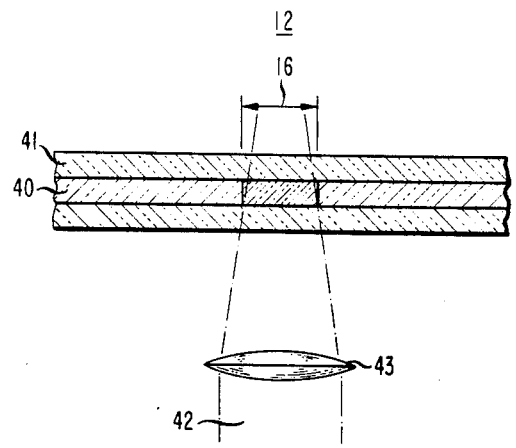
FIG. 4 schematically illustrates formation of a tap by activation, by means of exposure of a region of fiber to actinic radiation.

An exemplary method for exposure of the intended tap region of a fiber to activating radiation is schematically depicted in FIG. 4, showing a section of a fiber 12, comprising a core region 40 and a cladding region 41 surrounding the core. Not shown are protective coatings and the like. Core 40 differs in chemical composition from cladding 41, comprising, for instance, an effective concentration of an activatable chemical species. The beam of activating radiation 42 is shaped by appropriate means, e.g., focusing means 43, or aperture means, such as to irradiate a limited portion of the fiber, the intended tap region 16.

Some activatable species, e.g., some color center-forming species, are "bleachable". By this I mean that the change in fiber properties caused by activation of such species is reversible by appropriate means, typically heating. Fibers containing bleachable activatable species thus have the additional advantage of permitting the formation of temporary taps. This not only permits liberal movement of tap sites in installed systems, but may be useful during the installation of fiber systems, since it may permit installers to check on systems continuity and other properties at arbitrary intermediate points along the fiber.

I will next describe in some generality aspects of the invention pertaining to predisposed emission means of the second type. Such means comprise a localized variation in at least one fiber parameter, introduced into the fiber during fiber manufacture, adapted to causing increased emission of signal radiation. Typically a multiplicity of emission regions comprising such localized variations are introduced into the fiber during fiber manufacture. Since all of these regions are removing signal radiation from the fiber, whether or not the regions are used as a tap site, the variations are advantageously introduced spaced apart, with relatively long unperturbed stretches of fiber between emission regions.

Emission-producing predisposed localized variations in any appropriate fiber parameter are considered to be within the scope of the invention. Exemplary parameters are fiber diameter, core diameter, or chemical composition or refractive index of core and/or cladding. Such localized parameter changes are advantageously introduced into a fiber during drawing of the fiber from the preform. An exemplary method for introducing geometrical variations along a fiber is disclosed, for instance, in U.S. Pat. No. 3,912,478, co-assigned with this, issued Oct. 14, 1975 to H. M. Presby. The fiber diameter can also be varied by, e.g., pulsed perturbations in fiber pulling tension, or by appropriately changing the temperature of the material being drawn from the preform, e.g., by means of irradiation of the fiber with pulsed electron or electromagnetic radiation.

It is also possible to introduce appropriate localized variations, typically composition variations, into the preform during preform manufacture. Such variations will be transferred to the fiber in the drawing process. However, since typically at least a hundred to one reduction in diameter occurs in the drawing of fiber from a preform, with attendant increase in length by the square of the diameter reduction factor, variations in the preform have to be very closely spaced and be of very short longitudinal extent, in order to result in appropriately spaced and appropriately short emission regions in the fiber. For instance, in order to obtain 5 centimeter long emission regions with 10 meter longitudinal spacing, the variations in the preform have to be about 5 $\mu m$ long, and be spaced at 1 mm intervals, if the diameter reduction factor is 100 to 1. Such requirements are typically difficult to achieve in practice. Therefore, although, in principle, such localized variations can be incorporated into preforms produced by any of the currently practiced manufacturing methods, including MCVD (modified chemical vapor deposition), and VAD (vapor axial deposition), this is not considered to be a preferred approach in the light of current preform fabrication technology.

Figure 5:
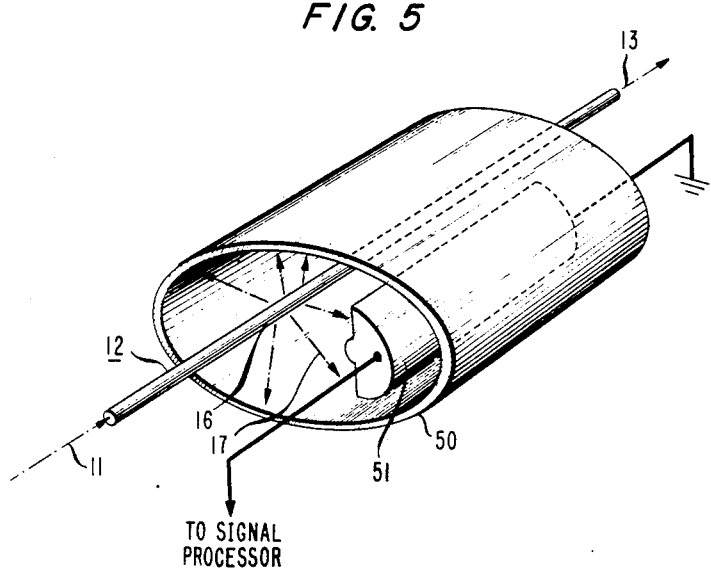
FIG. 5 schematically shows an arrangement useful for detecting radiation emitted from the emission region of a fiber.

FIG. 5 schematically shows an exemplary fiber tap. Tap region 16 of fiber 12 emits radiation 17, which is detected by detector 51, whic transforms incident electromagnetic energy into, typically, an electrical signal, which can be processed by conventional means. In order to increase the signal-to-noise ratio of such a tap, and to keep the amount of radiation that has to be removed from the propagating signal radiation low, it is advantageous to use means for increasing the proportion of emitted radiation that is incident upon the detector. Exemplary of such means is the cylindrical reflector of elliptical cross-section 50, with the fiber placed substantially at one focal point of the ellipse, and the light-sensitive region of the detector substantially at the second focal point of the ellipse. The efficiency of detection can also be increased by coupling of the detector to the fiber cladding by index-matching means.

Emission means, either appropriate activatable means or active means, can be used to form a reciprocal tap, i.e., a tap that permits coupling radiation into the fiber as well as permitting emission of radiation from the fiber. Reciprocal taps can be formed by e.g., creating appropriately periodic longitudinal fiber parameter variations in the fiber, which can serve as a grating coupler. A reciprocal tap can be introduced during fiber pulling, e.g., by periodically exposing the still deformable fiber to pulsed IR radiation, or by exposure to activating means, e.g., heating means.

A tap formed with the aid of an absorbing activatable species can be reciprocal without the need of a grating or other coupling structure, e.g., an appropriately inclined refractive index-discontinuity in the fiber. Irradiating such a tap region with radiation of appropriate wavelength results in absorption, and consequently can result in emission of radiation into all directions. Some of the emitted radiation therefore will be trapped in the fiber due to total internal reflection, and will propagate away from the tap.

Since at present the most important fiber material is silica ($SiO_2$), with various dopants, e.g., Ge, P, F, B, Al, being used to appropriately modify the refractive index, I will now illustrate the practice of the invention in regard to $SiO_2$-based fiberguides.

Exemplary candidates for use as nonabsorbing (at $\lambda_o$) activatable species, for 0.8 $\mu m < \lambda_o < 1.6$ $\mu m$, are Al and Ge. These elements have substantially stable activated states in SiO₂, with the optical properties of an activated entity being substantially different from those of the ground state entity. These elements can be incorporated into silica-based material during deposition of the material, e.g., by adding an appropriate gaseous compound (e.g., a chloride of the element) to the glassforming precursor/oxygen mixture in MCVD, and can be activated by exposure to actinic radiation.

EXAMPLE 1

During MCVD deposition of core material, an effect amount of $GeCl_4$ is added to the reactant mixture, resulting in fiber having a Ge-doped core containing about 3 atomic pecent Ge in the ground state. After consolidation, collapse, fiber drawing, coating, and coating removal from a 1 cm long intermediate section of fiber, the bared section is exposed for about 5 sec to about 100 mW of visible radiation of about 500 nm wavelength, focused to a 10 μm spot. This exposure results, via two-photon absorption by Ge, in an index change of about $10^{-5}$ at $\lambda_o = 1.3$ μm, resulting in enhanced emission of radiation of that wavelength from the irradiated fiber section.

EXAMPLE 2

Using exposure for about 5 sec to about 1 mW of focused UV radiation of about 250 nm wavelength, an index change similar to that of Example 1 is achieved in the Al-doped core of silica fiber, also resulting in enhanced radiation emission.

EXAMPLE 3

After formation of a preform by MCVD, fiber is drawn from the preform at a rate of 1 m/sec. A $CO_2$ laser (10.6 μm, about 5 watts) is focused onto the fiber between draw furnace and coating applicator. The focal spot is about 50 μm in diameter. The laser is pulsed at a rate of $10^4$ pulses/sec, for $5 \times 10^{-3}$ sec at 1 sec intervals. This results in formation of 5 mm long corrugations having a characteristic modulation length of ~100 μm. Enhanced emission of 1.3 μm radiation occurs in the corrugated regions of the fiber.

Although SiO₂-based fiber is currently the medium of choice for long-haul transmission, my invention is not limited to the use of SiO₂-based fibers. For instance, compound glass fibers can advantageously be used for on-premise applications and the like, where low loss is not of dominant concern. In such multicomponent glasses a great variety of color centers can be formed (see, for instance, A. Bishay, op. cit.,) which can be used as absorbing or nonabsorbing emission means. Furthermore, nonoxidic glasses, including those formed from halides and chalcogenides, are expected to exhibit the emission-causing phenomena described herein. Therefore, I expect that the invention can advantageously be practiced also in fiber comprising nonoxidic glass. In addition to the previously mentioned dopants Ge, P, F, B, and Al at least some of which may be usefully employed in the practice of the invention, at least some of the following elements may be useful for forming taps by activation according to the invention: Ti, Ta, La, Nb, Ga, In, Sn, Sb, Bi, Be, Mg, Ca, Sr, Cd, Ba, and the 4f-type rare earth elements (the lanthanides).

What is claimed is:

1. Communication system comprising
   a. an optical fiber comprising a core and a clad and having an electromagnetic radiation absorption spectrum,
   b. means for producing electromagnetic radiation of at least one given wavelength $\lambda_o$, the radiation to be referred to as "signal radiation", means for coupling at least part of the signal radiation into the fiber at a first fiber location, means for detecting signal radiation at a second fiber location spaced from the first fiber location, the signal radiation to be guided in the optical fiber from the first to the second fiber location,
   c. means for causing emission of radiation from the fiber at a fiber region located between the first and the second fiber location, the means to be referred to as "emission means", the region of emission to be referred to as the "emission region", and
   d. means for detecting the radiation emitted from the emission region,
   CHARACTERIZED IN THAT
   e. the emission means can be placed at any point between the first and second fiber locations and comprise predisposed emission means, "predisposed emission means" being emission means that comprise a longitudinally substantially uniform distribution in the fiber of at least one activatable chemical species, incorporated into the fiber during manufacture of the fiber, the emission region formed by exposing a portion of the fiber to activating means.

2. System according to claim 1, wherein the activating means comprise electromagnetic radiation, electron radiation, ion radiation, or heat.

3. System according to claim 2, wherein exposure of the fiber to the activating means produces a change in the microstructure of fiber material in the exposed portion of the fiber.

4. System according to claim 2, wherein exposure to the activating means results in substantial heating of the fiber region, and the activatable chemical species is aluminum.

5. System according to claim 2, wherein the exposure of the fiber to the activating means produces a change in the electromagnetic radiation absorption spectrum of the fiber in the exposed fiber portion.

6. System according to claim 5, wherein the activating means are electromagnetic radiation of wavelength less than about $\lambda_o$.

7. System according to claim 2, wherein the exposure of the fiber to the activating means produces a change in the refractive index for signal radiation in at least a part of the fiber in the exposed fiber portion.

8. System according to claim 7, wherein the activating means are electromagnetic radiation, and the activatable chemical species is Ge.

9. System according to claim 1, wherein the predisposed emission means furthermore are means for electromagnetic radiation into the fiber.

10. System according to claim 1 wherein the activatable chemical species is a bleachable chemical species.

11. Communications system according to claim 1, wherein the activatable species has a radially nonuniform distribution in the fiber.

12. Communications system according to claim 1, wherein the activatable species is selected from the group consisting of Ge, Al, P, F, B, Ti, Ta, La, Nb, Ga, In, Sn, Sb, Bi, Be, Mg, Ca, Sr, Cd, Ba, and the 4f-type rare earth elements.

13. Communications system according to claim 12, wherein the fiber material comprises silica.

* * * * *